United States Patent

Ruffell

[11] Patent Number: 5,825,461
[45] Date of Patent: Oct. 20, 1998

[54] BELLOWS FOR OPTICAL EQUIPMENT

[75] Inventor: Edward Charles Ruffell, Hampshire, England

[73] Assignee: Panavision Europe Limited, Shepperton, England

[21] Appl. No.: 433,478
[22] PCT Filed: Nov. 12, 1993
[86] PCT No.: PCT/GB93/02336
 § 371 Date: May 11, 1995
 § 102(e) Date: May 11, 1995
[87] PCT Pub. No.: WO94/11780
 PCT Pub. Date: May 26, 1994

[30] Foreign Application Priority Data

Nov. 13, 1992 [GB] United Kingdom .......... 9223845

[51] Int. Cl.⁶ .................................................. G03B 17/04
[52] U.S. Cl. ................................................... 354/187
[58] Field of Search ........................ 354/187, 188, 354/189, 190, 191, 192, 193, 194

[56] References Cited

U.S. PATENT DOCUMENTS

| | | | |
|---|---|---|---|
| 1,500,391 | 6/1924 | Hutchings | 354/187 |
| 2,578,111 | 12/1951 | Turner et al. | 138/121 |
| 3,375,767 | 4/1968 | Hanlon | 354/187 |
| 3,421,425 | 1/1969 | Brandt et al. | 354/187 |
| 3,636,848 | 1/1972 | Mazur | 354/187 |
| 4,205,895 | 6/1980 | Yurdin et al. | 350/60 |
| 4,325,769 | 4/1982 | Moyse et al. | 156/217 |
| 4,547,053 | 10/1985 | Tobler | 354/187 |
| 4,662,734 | 5/1987 | Nishi | 354/187 |

Primary Examiner—Howard B. Blankenship
Assistant Examiner—Matthew Miller
Attorney, Agent, or Firm—Hodgson, Russ, Andrews, Woods & Goodyear LLP

[57] ABSTRACT

Bellows (14) for optical equipment comprising a tubular concertina structure of adjustable axial length, the folds of the concertina structure acting as hinges, the structure having portions of laminated construction, a first layer of the construction being of flexible light-inhibiting material (66) and a further layer (70) being of load-bearing material which stiffens the folds whereby upon axial adjustment the bellows retains its configuration without external support or restraint.

21 Claims, 2 Drawing Sheets

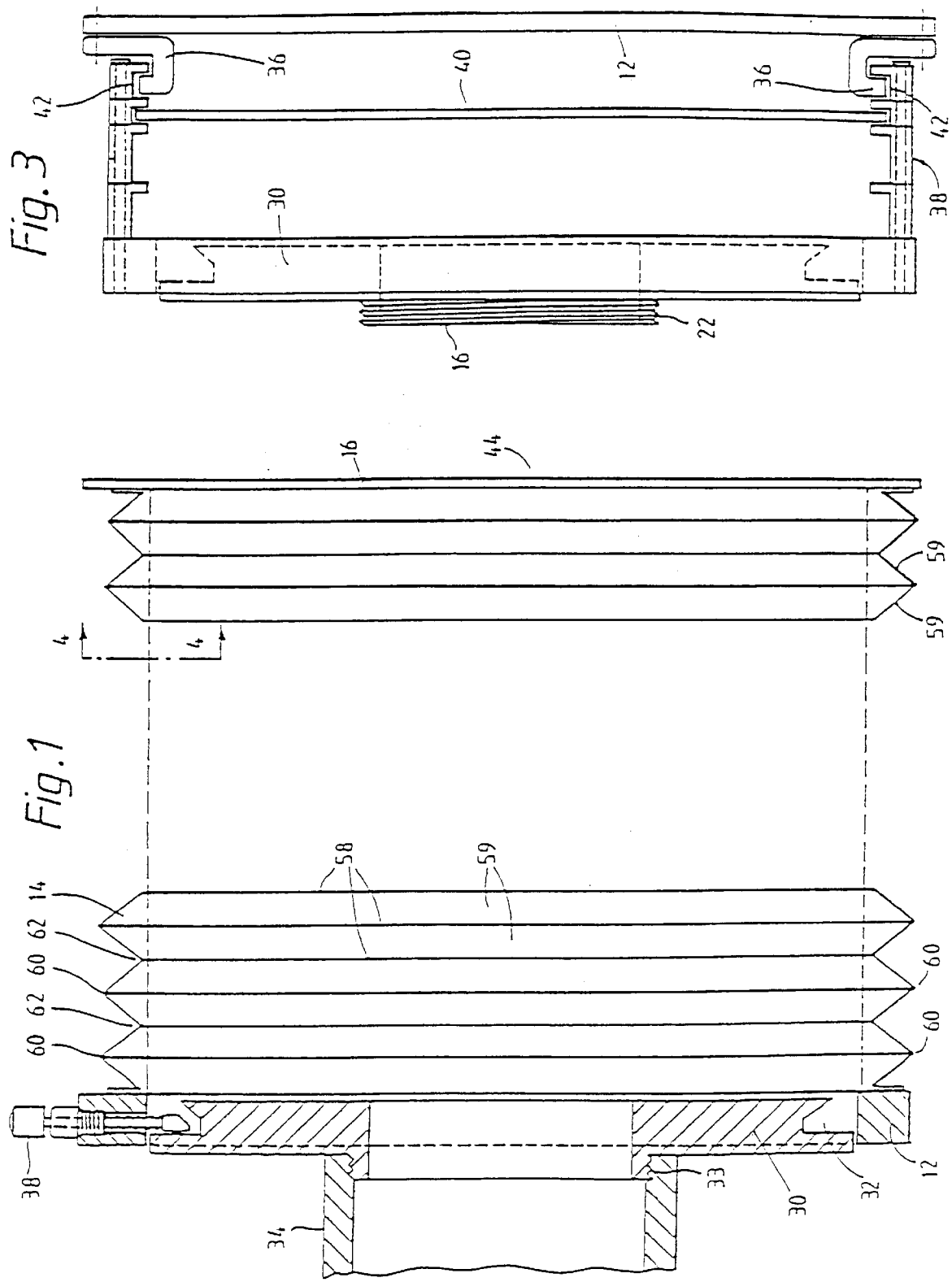

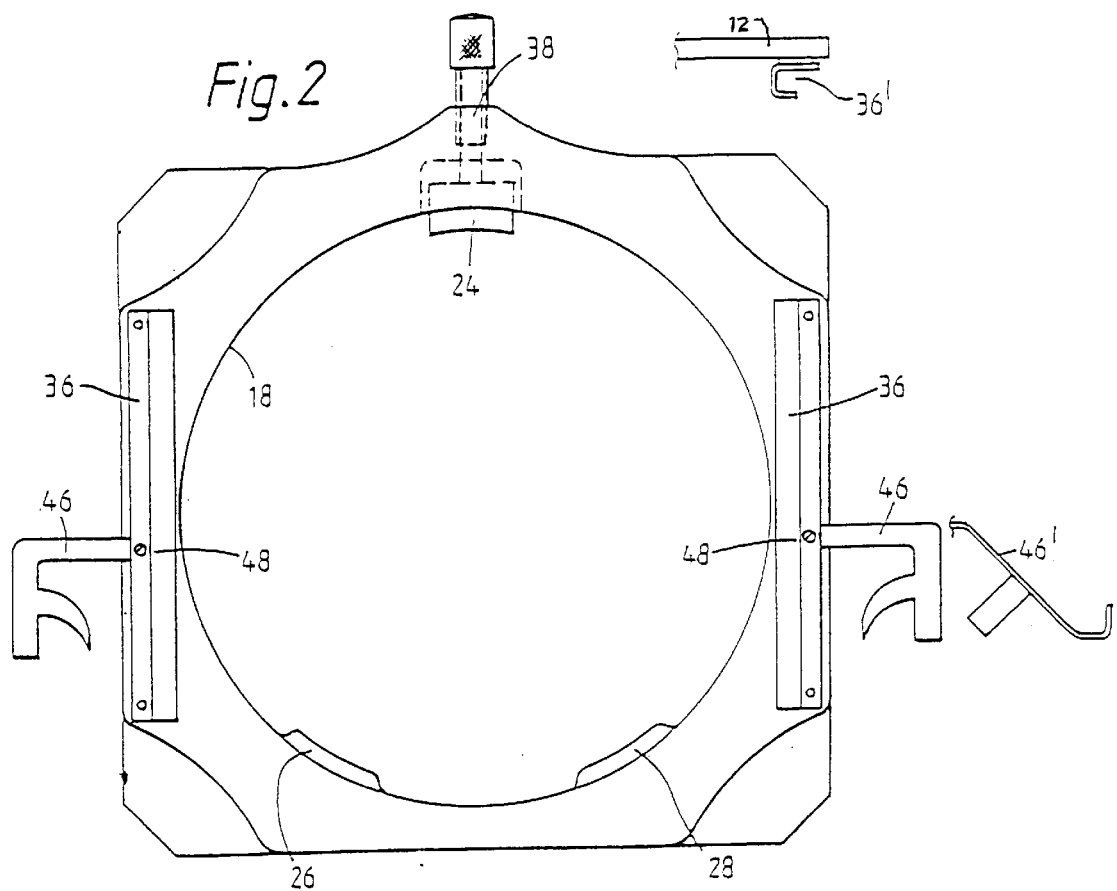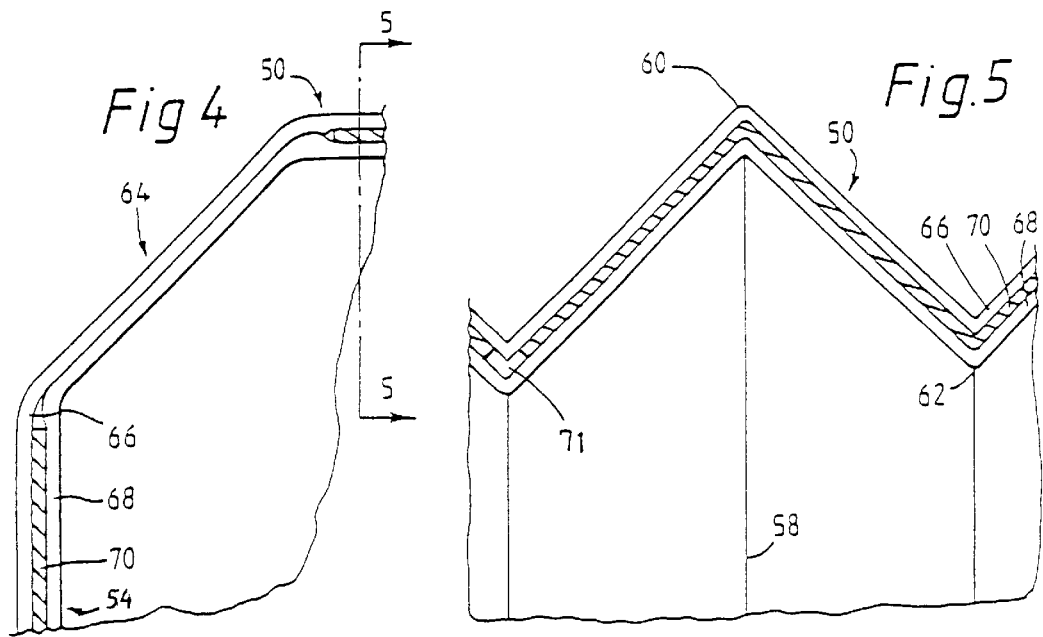

BELLOWS FOR OPTICAL EQUIPMENT

BACKGROUND OF THE INVENTION

This invention relates to bellows for optical equipment.

Bellows have been used in optical, particularly photographic, equipment for many years.

Typically such a bellows defines a light-tight tube between a lens and a film emulsion or other light-responsive recording medium. The bellows is not self-supporting, and is carried between a lens at one end and the camera body at the other, the lens being mounted on rails and moveable back and forth along the optical axis of the equipment.

A lens hood is a useful accessory intended to be fitted on the front of a camera lens or of optical accessories (filters etc) to screen the optical surfaces from incident sunlight or other unwanted light source. The lens hood however must not mask the field of view of the lens, and this causes difficulty with variable focal length (zoom) lenses.

A lens hood with a wide enough field of view not to mask the lens when set at its shortest focal length will be ineffective when the lens is zoomed to its telephoto mode with a narrow field of view. Conversely a lens hood suited to the telephoto mode will mask the lens when zoomed to wide-angle.

SUMMARY OF THE INVENTION

The present invention has an object the provision of a lens hood of adjustable axial length, and therefore field of view, but which avoids the need for a heavy and unwieldly supporting rail. The invention contemplates the use of a novel bellows construction which may be of use for other purposes in optical equipment. For example, it may advantageously be employed in large-format cameras in which support structure has hitherto been necessary (in addition to the lens guide rails mentioned above) to support the bellows and prevent it sagging.

The invention provides bellows for optical equipment comprising a tubular concertina structure of adjustable axial length, the folds of the concertina structure acting as hinges, said structure having portions of laminated construction, a first layer of said construction being of flexible light-inhibiting material and a further layer being of load-bearing material which stiffens the folds whereby upon axial adjustment the bellows retains its configuration without external support or restraint.

The load-bearing material may be plastically deformable at the folds to permit adjustment of the axial length of the bellows.

Preferably, the load-bearing material is substantially continuous across the folds of the concertina structure.

Included in the term "substantially continuous" are arrangements in which the load-bearing material is perforated at intervals along the line of a fold, the remaining material providing a plurality of connections between the load-bearing material in axially adjacent pleats of the bellows which connections are distributed along the length of the fold. Thus the connections may occupy at least 50% of the length of the fold, and preferably at least 75%.

The bellows may be of constant axial cross-section or may diverge, e.g. from one end to the other.

The layer of load bearing material may be sandwiched between two layers of light-inhibiting material.

The tubular structure may be polygonal in cross-section perpendicular to its longitudinal axis with an even number of sides, portions of the load bearing material being dispersed in side portions of the polygonal structure, said portions of load bearing material being separate from each other.

In a preferred form of the invention the portions of load bearing material do not extend to the corners of the polygonal tubular structure, the flexible material being folded at said corners to permit the adjustment of the axial length.

The folds in the flexible material may form bevelled corners on the polyhedral tubular structure, which preferably is four-sided.

The included angle of the concertina folds may change through twenty degrees or less when the bellows is moved from a fully extended to a fully retracted position. Preferably, the change in the included angle is about 10 degrees, or between 5 and 10 degrees.

The load bearing material may be in the form of a corrugated sheet, for example of a metal foil e.g. of aluminium alloy.

The light-inhibiting material may contain reinforcing fibres.

The invention also includes optical equipment for example a lens hood comprising bellows as set forth above.

The invention will now be described by way of example only with reference to the accompanying drawings, wherein;

BRIEF DESCRIPTION OF THE DRAWINGS

FIG. 1 shows a lens hood embodying bellows according to the invention.

FIG. 2 is an end view of part of the lens hood of FIG. 1.

FIG. 3 shows a filter holder to which the lens hood may be fitted.

FIG. 4 is a partial section on line 4—4 of FIG. 1, and

FIG. 5 is a partial section on line 5—5 of FIG. 4.

DESCRIPTION OF THE PREFERRED EMBODIMENT

Referring to FIG. 1, a lens hood consists of a foundation ring 12, a bellows 14 and a rectangular frame 16. The foundation ring 12 is as described in more detail in our co-pending application number PCT/GB92/00762 (the disclosure of which is incorporated in this specification by reference), and is intended to be connected to the lens of a film, video or ENG camera or to a filter carrier itself supported from the lens.

Referring also to FIG. 2, the foundation ring 12 has a circular aperture 18 with lugs 24, 26, 28. One lug 24 is spring-loaded and can be withdrawn by rod 38 to permit the ring to be fitted to a mounting 30 having a peripheral groove 32, as described in our aforesaid co-pending application. The mounting is fitted to a conventional internally-threaded end 33 of a camera lens 34.

The foundation ring 12 also is provided with a pair of elongated hooks 36 on its rear face which enables the lens hood to be fitted to the front of a filter element holder as also described in our earlier application. The profile of the hooks is shown at 36'. Referring to FIG. 3, a filter element holder 38 is shown in plan including a representative filter 40 and carried by the lens mounting 30. The lens hood foundation ring 12 may be attached to the front of the holder 38 by sliding the hooks 36 into slots 42 of the holder.

The frame 16 defines the field of view available to the lens through the lens hood and can be moved forwards and away from the lens along the optical axis 44 of the lens hood by extending or collapsing the bellows 14.

Clips 46 (shown in profile at 46') on two opposite sides of the lens hood are pivotally mounted at 48 on the ring 12 and extend towards the frame 16 so that when the bellows is fully collapsed the frame 16 may be clipped securely to the foundation ring 12 for transport or storage.

The bellows 14 defines a tube of substantially polygonal cross-section, having an even number of sides; in this case it is substantially square, having top and bottom panels 50, 52 and side panels 54, 56.

Each panel of the bellows formed with folds 58 between pleats 59 to define regular corrugations having the same pitch.

As is known from the manufacture of conventional bellows the peaks (e.g. 60 FIG. 5) of the corrugations in each panel are aligned with the corrugations in the opposite panel, and with the troughs (e.g. 62) of the corrugations in the panels to which it is joined. The corrugations of the side panels thus can be considered to be in phase with each other, and 180° out of phase with those of the top and bottom panels. The bellows material between adjacent top or bottom and side corrugations is folded to accommodate the relative movement of the corrugations upon extension and contraction of the bellows, and results in a bevelled edge 64 at each corner of the square tube. The bellows material is two layers of light-tight fabric 66, 68 with sheets of plastically-deformable aluminium alloy sheet 70 disposed between the layers 66, 68 in the panels 50, 52, 54, 56 of the bellows. The aluminium sheet and the fabric layers are bonded together by an adhesive which remains flexible in use.

The aluminium sheets 70 do not extend into the regions of the fabric 66, 68 forming the bevelled edges 64, the fabric layers being stuck directly to each other in these regions, and having sufficient flexibility to adopt the complex folds necessary to accommodate movement of the bellows. The layers of light-tight fabric 66,68 are made of a rubberised plastic material reinforced with fibres, which may be either woven or non-woven.

The aluminium sheets 70 in the side panels 54, 56 of the tube, being vertically oriented, provide support for the sides of the bellows and prevent them bowing out of the vertical plane. The sheets 70 in the top and bottom panels 50, 52 likewise maintain the shape of the top and bottom panels of the bellows tube and prevent them sagging. Of course, if the camera is rotated through 90° e.g. from landscape to portrait format, the top and bottom panels become the sides of the bellows and the sheets 70 therein provide support as already described.

Each sheet 70 is continuous and thus extends across the folds 58 of the panel of which it forms part. The aluminium sheets, which in a lens hood are typically 75 microns (7.5 nm) thick in soft tempered (annealed) condition, stiffen the hinges of each panel and ensure that the folds do not open more in the top panel than in the bottom one due to the moment of the bellows about the foundation ring 12.

The bellows is configured such that to move the lens hood from its minimum (retracted) axial length to its maximum (extended) length requires the folds to open such that the included angle in the folds increases by no more than 20 degrees, and preferably no more than about 10 degrees. When fully extended the included angle is typically no more than 60 degrees and preferably about 45 degrees. The change in included angle is accommodated by plastic deformation of the aluminium sheets 70. Being soft-tempered and subject to only limited deformation many extension and retraction cycles can be accomplished without the aluminium becoming work-hardened.

The aluminium sheet at each corrugation fold acts as a plastic hinge enabling the bellows to be adjusted axially and to maintain its adjusted position without springing back or moving loosely to an extended or collapsed position.

Thus the bellows maintains its configuration after adjustment, both in terms of its cross-section and its axial length, without any external support or restraint.

The pliability of the structure is such that if required the frame 16 may be tilted at a moderate angle to the optical axis of the bellows.

The aluminium sheets may be replaced by other material capable of providing adequate support and of deforming plastically at the corrugation hinges. Further if the bellows is for use only in a single orientation, e.g. the camera is never turned from landscape to portrait format, the aluminium sheets in the top and bottom panels 50, 52 could be omitted to secure some reduction in manufacturing costs.

The aluminium sheets 70 provide a continuous bridge across each fold 58, except in the corner region 64. In some applications the sheets 70 may be perforated at intervals along the line of the folds 58, as shown, by way of a variation, at 71 in FIG. 5. The portions of sheet 70 in adjacent pleats 59 then are joined across the hinge by the remaining material which forms a series of connecting pieces distributed along the length of the fold. If there are only a few perforations the sheet remains substantially continuous across the fold. If there are a greater number of perforations, the remaining material preferably still occupies at least 50% of the length of the fold, and preferably 75% or more. The use of such a construction enables thicker sheets to be used without the bellows becoming excessively resistant to axial adjustment.

I claim:

1. Bellows comprising a tubular corrugated concertina structure of adjustable axial length, the concertina structure having pleats with folds between axially adjacent pleats acting as hinges, at least some of said pleats being of laminated construction, a first layer of said construction being of flexible light-inhibiting material and a further layer being of load-bearing material which extends across and stiffens the folds between said pleats, substantially throughout the length thereof.

2. Bellows comprising a tubular corrugated concertina structure of adjustable axial length, the concertina structure having pleats with folds between axially adjacent pleats acting as hinges, at least some of said pleats being of laminated construction, a first layer of said construction being of flexible light-inhibiting material and a further layer being of load-bearing material which extends across the folds between said pleats, the load-bearing material being perforated at intervals along the line of a said fold, the remaining material providing a plurality of connections between the load-bearing material in said axially adjacent pleats which connections are distributed along the length of the fold.

3. Bellows as claimed in claim 1 or claim 2, wherein the load-bearing material is plastically deformable at the folds to permit adjustment of the axial length of the bellows.

4. Bellows as claimed in claim 1 or claim 2, wherein the layer of load bearing material is sandwiched between two layers of light-inhibiting material.

5. Bellows as claimed in claim 1 or claim 2, wherein the tubular structure is polygonal in cross-section perpendicular to its longitudinal axis with an even number of sides, the load bearing material being disposed in the pleats of at least some of the side portions of the polygonal structure, the loan bearing material in adjacent side portions being separate from each other.

6. Bellows as claimed in claim 5, wherein the load bearing material does not extend to the corners of the polygonal tubular structure, the flexible material being folded at said corners to permit the adjustment of the axial length.

7. Bellows as claimed in claim 5, wherein the polyhedral structure is four-sided.

8. Bellows as claimed in claim 6, wherein the folds in the flexible material form bevelled corners on the polyhedral tubular structure.

9. Bellows as claimed in claim 1 or claim 2, wherein the bellows is moveable between a fully extended and a fully retracted position, the included angle of the folds changing through twenty degrees or less between said positions.

10. Bellows as claimed in claim 1 or claim 2, wherein the load bearing material is in the form of a corrugated sheet.

11. Bellows as claimed in claim 1 or claim 2, wherein the load bearing material is metal foil.

12. Bellows as claimed in claim 11, wherein the metal foil is of aluminium alloy.

13. Bellows as claimed in claim 1 or claim 2, wherein the light-inhibiting material contains reinforcing fibres.

14. Optical equipment comprising a bellows as claimed in claim 1 or claim 2.

15. A lens hood comprising a bellows as claimed in claim 1 or claim 2.

16. Bellows as claimed in claim 1 or claim 2 for use with optical equipment.

17. Bellows as claimed in claim 2, wherein the remaining material occupies at least 50% of the length of the fold.

18. Bellows comprising a tubular corrugated concertina structure of adjustable axial length, the concertina structure having pleats with folds between axially adjacent pleats acting as hinges, at least some of said pleats being of laminated construction, a first layer of said construction being of flexible light-inhibiting material and a further layer being of load-bearing material which is at least substantially continuous across the folds between said pleats, so to stiffen the folds throughout the length thereof, the load-bearing material being plastically deformable at the folds to permit adjustment of the axial length of the bellows.

19. Bellows as claimed in claim 18, wherein the remaining material occupies at least 50% of the length of the fold.

20. Bellows for optical equipment comprising a tubular corrugated concertina structure of adjustable axial length, the concertina structure having pleats with folds between axially adjacent pleats acting as hinges, at least some of said pleats being of laminated construction, a first layer of said construction being of flexible light-inhibiting material and a further layer being of load-bearing material which is at least substantially continuous across the folds between said pleats, so to stiffen the folds throughout the length thereof, the load-bearing material being perforated at intervals along the line of a said fold, the remaining material providing a plurality of connections between the load-bearing material in said axially adjacent pleats of the bellows, which connections are distributed along the length of the fold.

21. Bellows as claimed in claim 20, wherein the remaining material occupies at least 50% of the length of the fold.

* * * * *